May 9, 1933.　　　　LE ROY H. HOFFER　　　　1,907,543
BEAD TRIMMING APPARATUS
Filed May 3, 1930　　　3 Sheets-Sheet 2

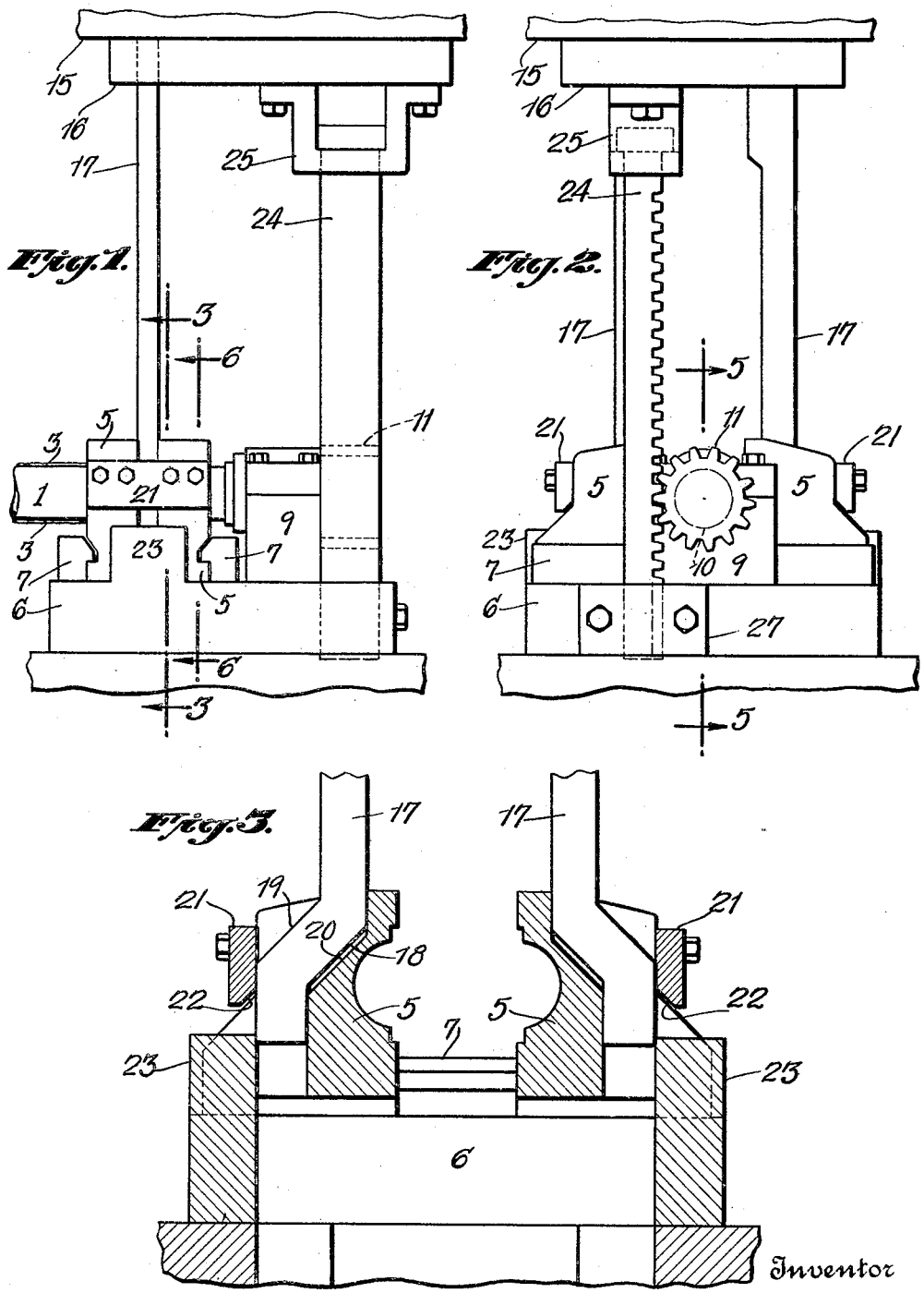

Inventor
LeRoy H. Hoffer.
By His Attorneys

May 9, 1933.  LE ROY H. HOFFER  1,907,543
BEAD TRIMMING APPARATUS
Filed May 3, 1930  3 Sheets-Sheet 3
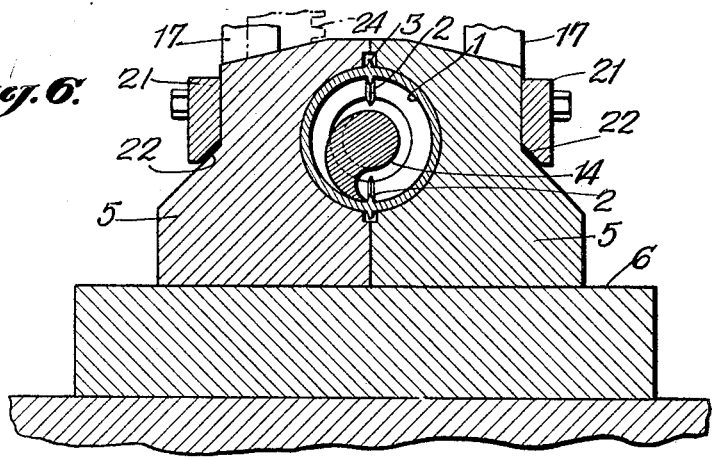
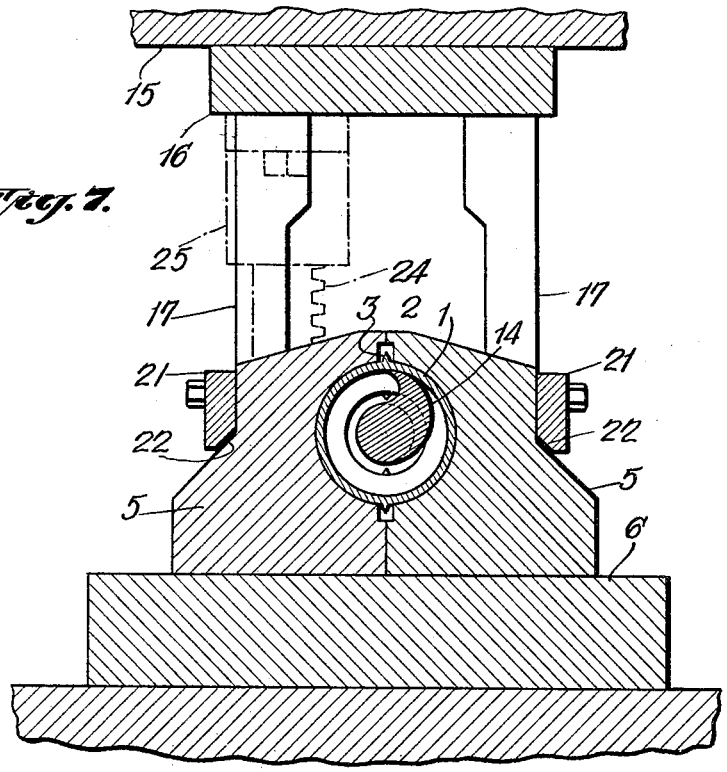
Inventor
LeRoy H. Hoffer.
By His Attorneys Patented May 9, 1933

1,907,543

UNITED STATES PATENT OFFICE

LE ROY H. HOFFER, OF BROOKLYN, NEW YORK, ASSIGNOR TO METROPOLITAN ENGINEERING COMPANY, OF BROOKLYN, NEW YORK, A CORPORATION OF NEW YORK

BEAD TRIMMING APPARATUS

Application filed May 3, 1930. Serial No. 449,673.

In welding axle housings and other tubular devices, it is customary to form an irregular flash or bead of extruded metal along the seam. For some uses of the product it is necessary to remove all or a portion of this bead. The present invention provides a simple mechanism for accomplishing this. The accompanying drawings illustrate a machine embodying the invention.

Fig. 1 is a side elevation;

Fig. 2 is an end elevation;

Figs. 3 and 4 are sections on the line 3—3 of Fig. 1 illustrating two different positions;

Figs. 6 and 7 are sections along the line 6—6 of Fig. 1, showing different positions.

Figure 5:
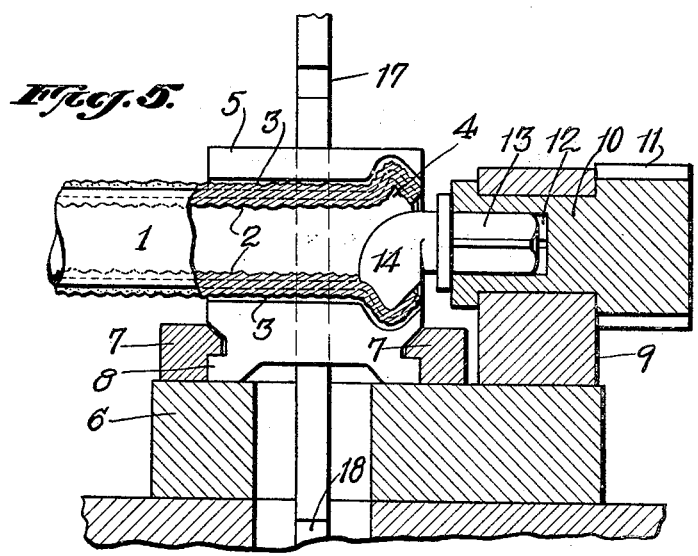
Fig. 5 is a section along the line 5—5 of Fig. 2.

In the case illustrated the parts are designed to work on a tube 1 formed of semicircular segments welded together along their edges. In the welding operation beads 2 are extruded on the inside and beads 3 on the outside of the seam. The outside beads may be retained or may be removed by other apparatus. The present machine is for removing the inside beads but it may be adapted to the removal of such beads in various locations. Before welding, the segments are bent as shown in Fig. 5 so that there is an internal annular groove 4 near the end. The walls of this groove are designed to be pressed together to form a two ply flange. It is essential therefore, that the inner bead within this groove be removed and the machine is designed particularly for this purpose. It may be used, however, with advantage in removing the bead from the end portion of tubes which are straight or of various other shapes.

The end of the tube is clamped between two clamping blocks 5, the faces of which are recessed to fit the outer shape of the work. The blocks move transversely on a base 6 and are guided in guides 7 which are grooved to receive flanges 8 on the bases of the blocks.

The base 6 carries adjacent to said guides a bearing block 9 in which is carried a shaft 10 having a gear 11 at its outer end. At the inner end of the shaft is a polygonal socket 12. The center of the shaft is in line with the center of the tube when the latter is clamped in place.

A bead removing tool has a stem 13 which enters the socket 12 and has a blade 14, the cutting edge of which is shaped to fit in the groove 4 and is thus offset from the center. Opposite to the edge, the blade is rounded as in Fig. 5. When the clamps are withdrawn the housing can be tilted downwardly and thus freed from the tool. For this class of work the tool may be fixed in its socket. In general it may be removably mounted in the socket. Then when the tube is withdrawn, carrying the tool with it, the tool can be bent down and withdrawn.

The machine is arranged to first clamp the tube and then rotate the tool through a sufficient arc to scrape or cut off both beads. Compare the positions of Fig. 6 and 7. Where there is a single bead to be trimmed, the cutter need not be rotated so far. The tool may be shaped and set so as to merely trim the ragged edge off the bead, or so as to remove the entire bead, or beads.

Figure 4:
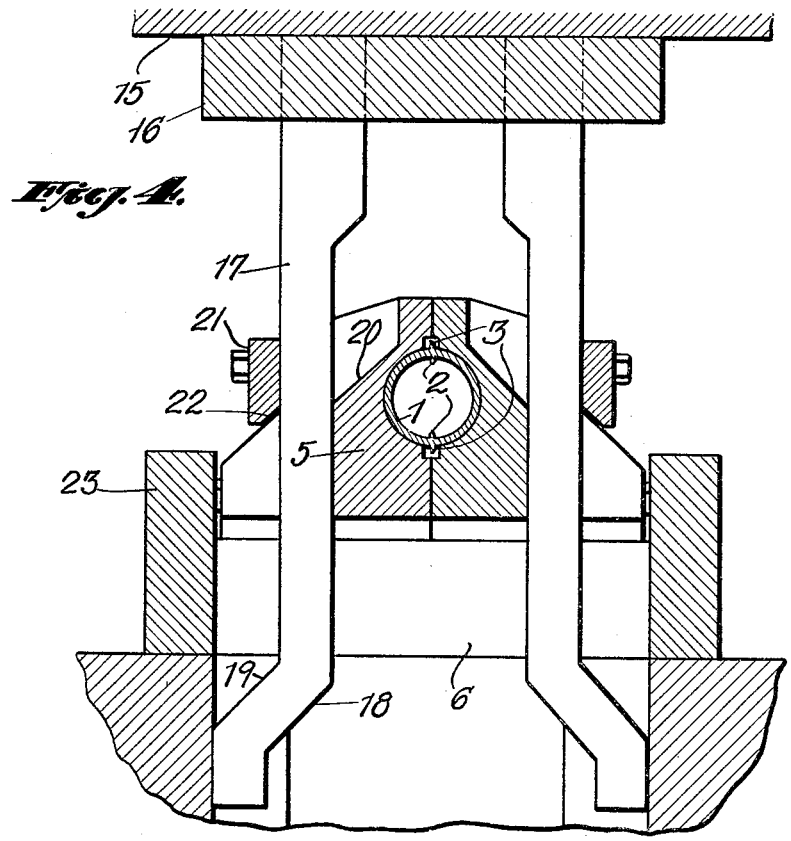

The clamping blocks are forced together by cam mechanism illustrated in Figs. 3 and 4. The machine has a reciprocating ram 15 on the lower face of which is a plate 16 which carries a pair of depending rods 17 having near their lower ends wedge faces 18 for pressing the clamping blocks together and 19 for separating them. Each clamping block 5 has near its upper end an oblique face 20 cooperating with the cam face 18 of the rod. Offset on the outside of each clamping block near its upper end is a back plate 21 having an oblique bearing face 22 cooperating with the face 19 of the rod.

Starting from the uppermost position, Fig. 3, the downward movement of the rods 17 causes an engagement between the cam faces 18 and 20 which presses the opposite clamping blocks together to the position of Fig. 4. The continued downward movement holds the clamps firmly against the work while the bead is being removed. The rods 17 are guided at their lower ends against upright portions 23 of the base of the machine. When the rods are lifted from the position of Fig. 4, they continue to hold the clamping blocks together until the faces 19 of the rods strike the faces 22 of the back bearing plates 21. The engagement of these faces throws the blocks into the open position of Fig. 3. This occurs near the top of the upward stroke.

The plate 16 also operates a rack 24 which engages the gear 11 and turns it. On the under face of the plate 16 is a bracket 25 in the bottom of which there is an opening through which the rack passes. On the upper end of the rack is a head 26 resting on the bracket and permitting a vertical play about equal to the vertical movement required in closing the clamping blocks. When the arm has moved down to this extent the plate 16 strikes the head of the rack and moves it downward so as to rotate the gear 11 and the blade of the head removing tool. The lower end of the rack is held in a bearing 27 on the end of the base block 6.

The operation is as follows: The first downward movement of the ram clamps the work against rotation. The continued downward movement rotates the blade and cuts off the bead, making about one complete rotation. In lifting the arm, the tool is rotated backward. It is shown in Figs. 6 and 7 shaped to cut in one direction only but it may be arranged to cut in both directions. At the top of the stroke the clamping blocks are widely separated. The tube is withdrawn by tilting it as described, or by drawing the tool out of its socket along with the work and then removing the tool and restoring it with the next piece of work.

Various modifications may be made by those skilled in the art without departing from the invention as defined in the following claims.

What I claim is:—

An apparatus for removing the internal bead from a welded tube having an annular offset on its inner face, said apparatus including in combination a tool having a driving shank and having a cutting portion offset at one side of said shank, said cutting portion fitting into the annular offset of the tube when the shank is in line with the tube, an actuating device for the tool having only a pin and socket connection with the shank permitting the free withdrawal of the tool in the axial direction while its cutting portion is engaged in the annular offset of the tube, the side of the tool opposite the cutting portion being free of lateral projections so that the withdrawal of the tube in the axial direction withdraws the tool from its actuating device and permits the removal of the tool from the work, and a pair of clamping jaws for holding the tube in operating position, both said jaws being movable laterally with respect to the axis of the tube so that when they are separated the tube may be withdrawn in the axial direction, a bearing for said actuating device, a fixed base carrying said bearing and said clamping jaws and means for first pressing said clamping jaws together to hold the tube in line with the shank of the tool and for then operating the tool-actuating device so that the tube and the tool are held against relative longitudinal movement during the cutting operation and the tool merely removes any inward projection into the annular offset portion of the tube.

In witness whereof, I have hereunto signed my name.

LE ROY H. HOFFER.